United States Patent
Shiraishi

(10) Patent No.: US 12,282,229 B2
(45) Date of Patent: Apr. 22, 2025

(54) LIGHT CONTROL WINDOW

(71) Applicant: TOPPAN HOLDINGS INC., Tokyo (JP)

(72) Inventor: Ryuji Shiraishi, Taito-ku (JP)

(73) Assignee: TOPPAN HOLDINGS INC., Tokyo (JP)

(*) Notice: Subject to any disclaimer, the term of this patent is extended or adjusted under 35 U.S.C. 154(b) by 0 days.

(21) Appl. No.: 18/602,605

(22) Filed: Mar. 12, 2024

(65) Prior Publication Data
US 2024/0219778 A1 Jul. 4, 2024

Related U.S. Application Data

(63) Continuation of application No. PCT/JP2022/034119, filed on Sep. 12, 2022.

(30) Foreign Application Priority Data

Sep. 13, 2021 (JP) ................. 2021-148695

(51) Int. Cl.
*G02F 1/13* (2006.01)
*G02F 1/1333* (2006.01)
(Continued)

(52) U.S. Cl.
CPC .......... *G02F 1/133769* (2021.01); *G02F 1/133512* (2013.01); *G02F 1/134309* (2013.01); *G02F 1/13439* (2013.01); *G02F 1/13712* (2021.01)

(58) Field of Classification Search
CPC .... G02F 1/13; G02F 1/1333; G02F 1/133331; G02F 1/133302; G02F 1/133305;
(Continued)

(56) References Cited

U.S. PATENT DOCUMENTS

2023/0194928 A1* 6/2023 Bello ................ G02F 1/133302
349/56

FOREIGN PATENT DOCUMENTS

JP 2018-050639 A 4/2018
JP 2019-045612 A 3/2019
(Continued)

OTHER PUBLICATIONS

International Search Report issued Nov. 8, 2022 in PCT/JP2022/034119 filed Sep. 12, 2022, 6 pages.
(Continued)

*Primary Examiner* — Thoi V Duong
(74) *Attorney, Agent, or Firm* — Oblon, McClelland, Maier & Neustadt, L.L.P.

(57) ABSTRACT

A light control sheet includes an adhesive layer attached to a transparent material, and a light control layer attached to the transparent material via the adhesive layer, the light control layer having a transparent state or an opaque state depending on a voltage is applied to the light control layer. At least one of the adhesive layer and the light control layer includes a filter absorbing part of light in the visible region. Transmittance is 10% or less for light with a wavelength range of 420 nm or less passing through the light control window from the light control sheet toward the transparent material in a first direction, and light from a standard light source D65 passing through the light control window from the transparent material toward the light control sheet in a second direction has a yellowness index YI of 10 or less according to JIS K 7373: 2006.

20 Claims, 8 Drawing Sheets

(51) Int. Cl.
*G02F 1/1335* (2006.01)
*G02F 1/1337* (2006.01)
*G02F 1/1343* (2006.01)
*G02F 1/137* (2006.01)

(58) Field of Classification Search
CPC ............ G02F 1/1335; G02F 1/133512; G02F 1/133514; G02F 1/1337; G02F 1/133769; G02F 1/1343; G02F 1/134309; G02F 1/13439; G02F 1/13712; G02F 2201/086; G02F 2202/28; E06B 2009/2464; E06B 9/24; Y02A 30/24; Y02B 80/00
See application file for complete search history.

(56) References Cited

FOREIGN PATENT DOCUMENTS

| | | |
|---|---|---|
| JP | 2019-515841 A | 6/2019 |
| JP | 2019-132927 A | 8/2019 |
| JP | 2020-052374 A | 4/2020 |
| JP | 2020-519952 A | 7/2020 |

OTHER PUBLICATIONS

Extended European Search Report issued Dec. 10, 2024 in corresponding corresponding European Patent Application No. 22867464.4, citing documents 15 and 16 therein, 10 pages.

\* cited by examiner

LIGHT CONTROL WINDOW

CROSS-REFERENCE TO RELATED APPLICATIONS

The present application is a continuation of and claims the benefit of priority to International Application No. PCT/JP2022/034119, filed Sep. 12, 2022, which is based upon and claims the benefit of priority to Japanese Application No. 2021-148695, filed Sep. 13, 2021. The entire contents of these applications are incorporated herein by reference.

BACKGROUND OF THE INVENTION

Field of the Invention

The present invention relates to light control windows.

Description of Background Art

JP 2019-45612 A describes an example of a light control sheet includes two transparent conductive films, a liquid crystal layer located between the transparent conductive films, and a functional layer located on one side of one transparent conductive film facing away from the liquid crystal layer. The entire contents of this publication are incorporated herein by reference.

SUMMARY OF THE INVENTION

According to one aspect of the present invention, a light control window includes a transparent material, and a light control sheet attached to the transparent material and including an adhesive layer attached to the transparent material, and a light control layer attached to the transparent material via the adhesive layer and having a transparent state or an opaque state depending on a voltage applied to the light control layer. The light control sheet is formed such that at least one of the adhesive layer and the light control layer includes a filter that absorbs part of light in a visible region, transmittance is 10% or less for light with a wavelength range of 420 nm or less passing through the light control window from the light control sheet toward the transparent material in a first direction, and light from a standard light source D65 that has passed through the light control window from the transparent material toward the light control sheet in a second direction has a yellowness index YI of 10 or less according to JIS K 7373: 2006.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
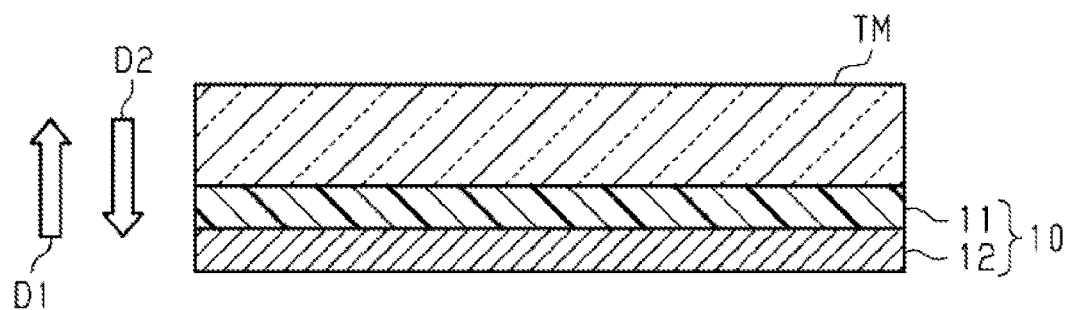
FIG. 1 is a schematic cross-sectional view illustrating a structure of a light control window.

Embodiments will now be described with reference to the accompanying drawings, wherein like reference numerals designate corresponding or identical elements throughout the various drawings.

Referring to FIGS. 1 to 22, an embodiment of a light control window will be described. In the present disclosure, the visible region refers to the wavelength range of greater than 380 nm and 750 nm or less, and the UV region refers to the wavelength range of 380 nm or less.

Structure

Referring to FIGS. 1 to 5, a structure of a light control window will be described.

As shown in FIG. 1, a light control window includes a light control sheet 10 and a transparent material TM. The transparent material TM is formed, for example, of soda-lime glass. The transparent material TM is not limited to soda-lime glass but may be formed of glass other than soda-lime glass. The transparent material TM may be formed, for example, of quartz glass, borosilicate glass, lead glass, or fluoride glass. The transparent material TM may be formed of a synthetic resin. If the transparent material TM is formed of a synthetic resin, the transparent material TM is preferred to be provided with a gas barrier layer on the surface to which the light control sheet 10 is attached. Thus, gases discharged from the transparent material TM are prevented from reaching the light control sheet 10.

The transparent material TM may be attached to the windows, doors, and roofs of various buildings. The transparent material TM may be flat or curved.

In the thickness direction of the light control window, the direction from the light control sheet 10 toward the transparent material TM is defined to be a first direction D1. In the thickness direction of the light control window, the direction from the transparent material TM toward the light control sheet 10 is defined to be a second direction D2. The light control sheet 10 is attached to one of the two surfaces of the transparent material TM, which is located indoors in the building. Therefore, the first direction D1 is a direction from indoors to outdoors of the building provided with the light control window. In contrast, the second direction D2 is a direction from outdoors to indoors of the building provided with the light control window.

The light control sheet 10 is attached to the transparent material TM. The light control sheet 10 includes an adhesive layer 11 and a light control layer 12. The adhesive layer 11 is attached to the transparent material TM. The light control sheet 12 is attached to the transparent material TM via the adhesive layer 11. The light control layer 12 has a transparent state or opaque state, depending on whether a voltage is applied thereto. At least one of the adhesive layer 11 and the light control layer 12 includes a filter absorbing part of light in the visible region. In other words, only one of the adhesive layer 11 and the light control layer 12 may include a filter, or both of the adhesive layer 11 and the light control layer 12 may include respective filters.

The adhesive layer 11 may have a single-layer structure, or may have a multilayer structure. If the adhesive layer 11 includes a filter and has a single-layer structure, the adhesive layer 11 functions as a filter and at the same time has adhesiveness to the transparent material TM. If the adhesive layer 11 includes a filter and has a multilayer structure, at least one of the layers included in the adhesive layer 11 functions as a filter. In other words, of the layers included in the adhesive layer 11, only one layer may function as a filter, or two or more layers may function as filters. In this case, the layer(s) functioning as filter(s) may be different from or the same as the layer(s) having adhesiveness.

The adhesive layer 11 may include a UV absorption layer. The light control window may have a transmittance of 1% or less for light in the wavelength range of 380 nm or less passing through the light control window in the second direction D2. Specifically, with the adhesive layer 11 including a UV absorption layer, the light control window may be formed to have a transmittance of 1% or less for light in the wavelength range of 380 nm or less. The transmittance of light in the wavelength range of 380 nm or less passing through the light control window in the second direction D2 is a total light transmittance. The total light transmittance is measured according to "Plastics—Determination of the total luminous transmittance of transparent materials—Part 1: Single beam instrument", JIS K 7361-1: 1997.

According to such a light control window, light in the wavelength range of 380 nm or less incident on the light control sheet 10 is absorbed by the adhesive layer 11. Thus, light resistance of the light control layer 12 is enhanced. In particular, the liquid crystal layer and the transparent substrate, which will be described later, of the light control layer 12 are prevented from being deteriorated by the light in the wavelength range of 380 nm or less. In the case where the light control sheet 10 is located indoors of a building as in the present embodiment, the light in the wavelength range of 380 nm or less, i.e., the UV light, is incident on the light control sheet 10 in the second direction D2. Since the adhesive layer 11 is located between the transparent material TM and the light control layer 12, light incident on the light control sheet 10 in the second direction D2 is absorbed by the adhesive layer 11, and therefore, the UV light is less likely to reach the light control layer 12. Therefore, deterioration of the liquid crystal layer and the transparent substrate included in the light control layer 12 can be easily reduced.

If the adhesive layer 11 has a single-layer structure, the adhesive layer 11 functions as a UV absorption layer. In this case, the adhesive layer 11 functions as a UV absorption layer and at the same time has adhesiveness to the transparent material TM. If the adhesive layer 11 has a multilayer structure, at least one of the layers included in the adhesive layer 11 functions as a UV absorption layer. In other words, of the layers included in the adhesive layer 11, only one layer may function as a UV absorption layer, or two or more layers may function as UV absorption layers. In this case, the layer(s) functioning as UV absorption layer(s) may be different from or the same as the layer(s) having adhesiveness.

If the adhesive layer 11 has a single-layer structure, the adhesive layer may be formed using various transparent adhesives. The adhesives may be, for example, optically clear adhesives (OCA). If the adhesive layer 11 functions as a filter, the adhesive layer 11 may contain various colorants, for example. The adhesive layer 11 may contain only one colorant or may contain two or more colorants. If the adhesive layer 11 contains two or more colorants, the adhesive layer 11 may contain a first colorant absorbing light in a first wavelength range of the visible region, and a second colorant absorbing light in a second wavelength range of the visible region different from the first wavelength range. The adhesive layer 11 may have a thickness, for example, of 10 μm or more and 75 μm or less. Thus, if the adhesive layer 11 provides a filter, the adhesive layer 11 can have both the function of attaching the light control layer 12 to the transparent material TM and the function of a filter. The adhesive layer 11 may contain a UV absorber.

If the adhesive layer 11 has a multilayer structure, of the multiple layers, the layer contacting the light control layer 12, and the layer contacting the transparent material TM may be formed of the transparent adhesives mentioned above. The layers formed of adhesives may contain a UV absorber, or the layer(s) different from the layers formed of adhesives may contain a UV absorber. The layers formed of adhesives may contain the colorants mentioned above, or the layer(s) different from the layers formed of adhesives may contain the colorants.

Figure 2:
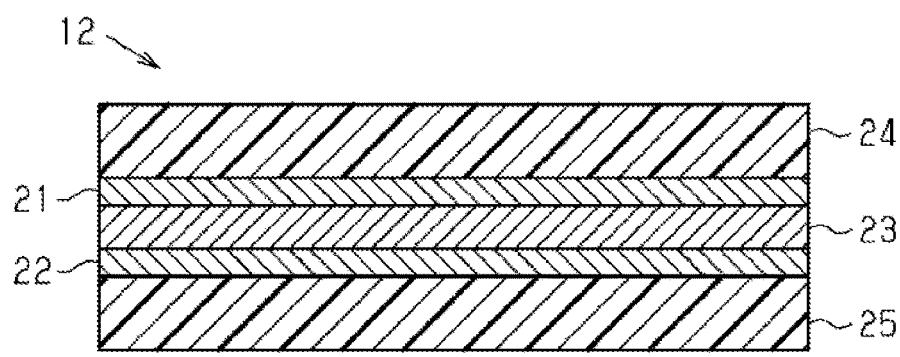
FIG. 2 is a schematic cross-sectional view illustrating a first example of a structure of a light control layer included in a light control sheet shown in FIG. 1.
Figure 3:
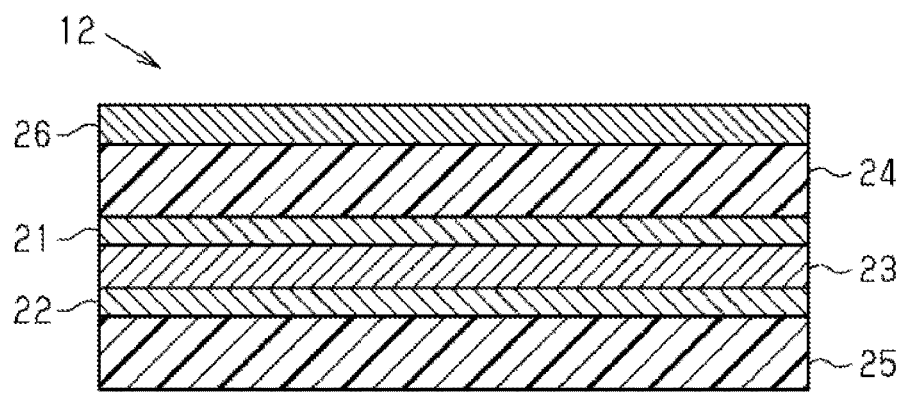
FIG. 3 is a schematic cross-sectional view illustrating a second example of the structure of the light control layer included in the light control sheet shown in FIG. 1.
Figure 4:
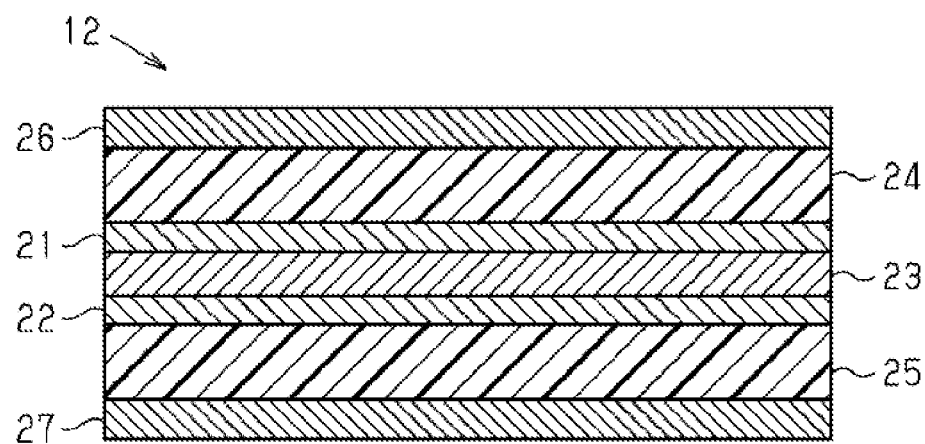
FIG. 4 is a schematic cross-sectional view illustrating a third example of the structure of the light control layer included in the light control sheet shown in FIG. 1.

FIGS. 2 to 4 illustrate structures of the light control layer 12.

As shown in FIG. 2, the light control layer 12 includes a first transparent electrode layer 21, a second transparent electrode layer 22, a liquid crystal layer 23, a first transparent substrate 24, and a second transparent substrate 25. The liquid crystal layer 23 is located between the first transparent substrate 24 and the second transparent substrate 25 in the thickness direction of the light control layer 12. The first transparent substrate 24 supports the first transparent electrode layer 21. The second transparent substrate 25 supports the second transparent electrode layer 22. The liquid crystal layer 23 is located between the first transparent electrode layer 21 and the second transparent electrode layer 22 in the thickness direction of the light control layer 12.

If the light control layer 12 includes the filter mentioned above and has the structure shown in FIG. 2, any of the first transparent electrode layer 21, second transparent electrode layer 22, liquid crystal layer 23, first transparent substrate 24, and second transparent substrate 25 may function as a filter. From the perspective of easily maintaining functions of these layers, it is preferred that at least one of the first and second transparent substrates 24 and 25 is formed to function as a filter. In other words, at least one of the first and second transparent substrates 24 and 25 may be formed to function as a filter, or both of the first and second transparent substrates 24 and 25 may be formed to function as filters. The liquid crystal layer 23 may also provide a filter. In this case, the liquid crystal layer can have both the function of switching between a transparent state and an opaque state and the function of a filter.

The light control layer 12 herein is of a normal type. Specifically, the light control layer 12 is in a transparent state when a voltage is applied between the first and second transparent electrode layers 21 and 22. In contrast, the light control layer 12 is in an opaque state when no voltage is applied between the first and second transparent electrode layers 21 and 22. The light control layer 12 in a transparent state has a lower haze than when it is in an opaque state. In the present disclosure, transparent state refers to a state in which the haze value in the light control layer 12 is saturated at the minimum value. In contrast, opaque state refers to a state in which the haze value in the light control layer 12 is saturated at the maximum value. Haze can be calculated using a method according to "Plastics—Determination of haze for transparent materials", JIS K 7136: 2000.

The material for forming the transparent electrode layers 21 and 22 may be any one material selected from indium tin oxide, fluorine-doped tin oxide, tin oxide, zinc oxide, carbon nanotubes, poly(3,4-ethylenedioxythiophene), and silver. The transparent electrode layers 21 and 22 may each have a thickness, for example, of 0.005 μm or more and 0.1 μm or less. This can reduce occurrence of cracking due to the light control sheet 10 being bent, while ensuring proper driving of the light control sheet 10.

The liquid crystal layer 23 includes a transparent resin layer and a liquid crystal composition. The resin layer contains multiple domains, which are voids formed in the resin layer. The liquid crystal composition is filled in the domains of the resin layer. The liquid crystal composition contains liquid crystal molecules. An example of the liquid crystal molecules may be any molecules selected from Schiff bases, azo types, azoxy types, biphenyls, terphenyls, benzoic acid esters, tolan types, pyrimidines, cyclohexanecarboxylic acid esters, phenylcyclohexanes, and dioxanes. The liquid crystal molecules are positive crystals with positive dielectric anisotropy.

Other than the liquid molecules mentioned above, the liquid crystal composition may contain a polymerizable composition for forming a resin layer, dichroic pigment, and the like. The polymerizable composition is a monomer or oligomer which can be polymerized by UV irradiation. The resin layer is a polymer of a polymerizable composition. As mentioned above, the polymerizable composition is a monomer or oligomer which can be polymerized by UV irradiation.

The material forming each of the transparent substrates 24 and 25 may be a synthetic resin or inorganic compound. Examples of the synthetic resin include polyesters, polyacrylates, polycarbonates, and polyolefins. Examples of the polyesters include polyethylene terephthalate and polyethylene naphthalate. Examples of the polyacrylates include polymethylmethacrylate. Examples of the inorganic compound include silicon dioxide, silicon oxynitride, and silicon nitride. The transparent substrates 24 and 25 may each have a thickness, for example, of 16 μm or more and 250 μm or less. If the thickness of the transparent substrates 24 and 25 is 16 μm or more, the light control sheet 10 can be easily processed and manufactured. If the thickness of the transparent substrates 24 and 25 is 250 μm or less, the light control sheet 10 can be produced using a roll-to-roll method.

As shown in FIG. 3, the light control layer 12 may include a first filter 26 which is different from the transparent electrode layers 21 and 22, liquid crystal layer 23, and transparent substrates 24 and 25. In the example shown in FIG. 3, the first filter 26 is located on one side of the first transparent substrate 24 facing away from the first transparent electrode layer 21.

The first filter 26 may have a single-layer structure, or may have a multilayer structure. The first filter 26 may be located on one side of the second transparent substrate 25 facing away from the second transparent electrode layer 22.

The first filter 26 is formed, for example, of a base material and a colorant. The base material may be a transparent synthetic resin, for example. The first filter 26 may contain various colorants. The first filter 26 may contain only one colorant or may contain two or more colorants. The first filter 26, when it contains two or more colorants, may contain a first colorant absorbing light in a first wavelength range of the visible region and a second colorant absorbing light in a second wavelength range of the visible region different from the first wavelength range.

As shown in FIG. 4, in addition to the first filter 26 mentioned above, the light control layer 12 may include a second filter 27 different from the first filter 26. In this case, the first filter 26 may be located on one side of the first transparent substrate 24 facing away from the first transparent electrode layer 21, and the second filter 27 may be located on one side of the second transparent substrate 25 facing away from the second transparent electrode layer 22.

As mentioned above, the first filter 26 may have a single-layer structure or may have a multilayer structure. Similarly to the first filter 26, the second filter 27 may have a single-layer structure, or may have a multilayer structure.

The second filter 27 is formed, for example, of a base material and a colorant. The base material may be a transparent synthetic resin, for example. The second filter 27 may contain various colorants. The second filter 27 may contain only one colorant or may contain two or more colorants. The second filter 27, when it contains two or more colorants, may contain a first colorant absorbing light in a first wavelength range of the visible region and a second colorant absorbing light in a second wavelength range of the visible region different from the first wavelength range.

The wavelength range of light absorbed by the first filter 26 may be the same as or different from the wavelength range of light absorbed by the second filter 27.

The light control layer 12 is not limited to be of the normal type mentioned above but may be of a reverse type. Specifically, the light control layer 12 may be in a transparent state when no voltage is applied between the first and second transparent electrode layers 21 and 22. In contrast, the light control layer 12 may be in an opaque state when a voltage is applied between the first and second transparent electrode layers 21 and 22. The light control layer 12 in a transparent state may have a lower haze than when it is in an opaque state.

Figure 5:
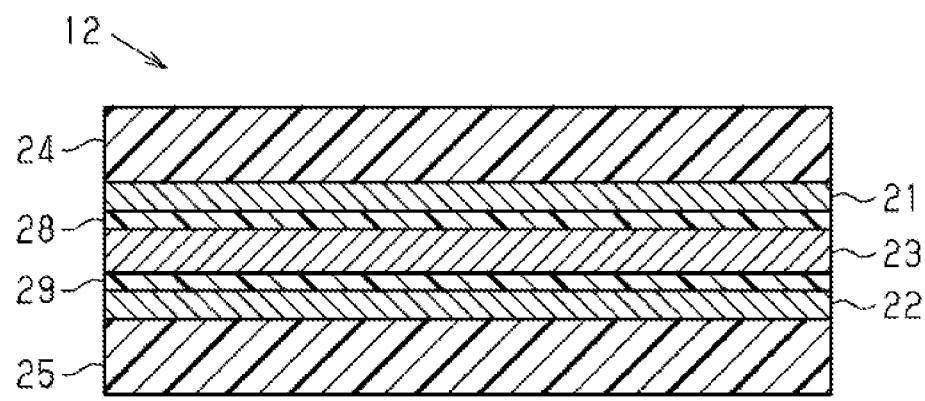
FIG. 5 is a schematic cross-sectional view illustrating a fourth example of the structure of the light control layer included in the light control sheet shown in FIG. 1.

FIG. 5 shows a structure of a reverse type light control layer 12.

As shown in FIG. 5, the light control layer 12 includes a first alignment layer 28 and a second alignment layer 29, in addition to the first transparent electrode layer 21, second transparent electrode layer 22, liquid crystal layer 23, first transparent substrate 24, and second transparent substrate 25. The first alignment layer 28 is located between the first transparent electrode layer 21 and the liquid crystal layer 23 in the thickness direction of the light control layer 12. The second alignment layer 29 is located between the second transparent electrode layer 22 and the liquid crystal layer 23 in the thickness direction of the light control layer 12.

The first alignment layer 28 and the second alignment layer 29 are vertical alignment films. In a state in which no voltage is applied between the first and second transparent electrode layers 21 and 22, the first alignment layer 28 causes the liquid crystal molecules contained in the liquid crystal layer 23 to align such that the long axes of the molecules become perpendicular to the surface of the first alignment layer 28. The second alignment layer 29 causes the liquid crystal molecules contained in the liquid crystal layer 23 to align such that the long axes of the molecules become perpendicular to the surface of the second alignment layer 29.

The material for forming the alignment layers 28 and 29 may include organic compounds, inorganic compounds, and mixtures of these. Examples of the organic compounds include polyimides, polyamides, polyvinyl alcohols, and cyanide compounds. Examples of the inorganic compounds include silicon oxides and zirconium oxides. The material for forming the alignment layers 28 and 29 may be silicones. Silicones are compounds having inorganic and organic parts. The alignment layers 28 and 29 may each have a thickness, for example, of 0.02 μm or more and 0.5 μm or less.

The liquid crystal molecules contained in the liquid crystal layer 23 are negative type liquid crystal molecules having negative dielectric anisotropy.

The light control sheet 10 may include functional layers other than the adhesive layer 11 and the light control layer 12 described above. Examples of other functional layers may include UV absorption layers and hard coat layers. If the light control sheet 10 includes a functional layer, the functional layer may be located on the first transparent substrate 24 or the second transparent substrate 25 whichever is located further from the adhesive layer 11.

Optical Characteristics of Light Control Window

Optical characteristics of a light control window according to an embodiment of the present invention will be described.

The light control window satisfies the following Conditions 1 and 2.

Condition 1: Transmittance is 10% or less for light in the wavelength range of 420 nm or less passing through the light control window in the first direction D1.

Condition 2: Light from a standard light source D65 that has passed through the light control window in the second direction D2 has a yellowness index YI of 10 or less according to JIS K 7373: 2006.

In other words, transmittance is 10% or less for light in the wavelength range of 420 nm or less, in light passing through the light control window from indoors to outdoors. The transmittance is a total light transmittance and is measured based on a method according to JIS K 7361-1: 1997. Also, in a state in which the light control layer 12 is opaque, light from the standard light source D65 passing through the light control window from outdoors to indoors has a yellowness index YI of 10 or less.

Insects have high visual sensitivity to the UV region. Specifically, a peak of visual sensitivity of insects has an apex at approximately 360 nm and bottoms at approximately 250 nm and 420 nm. Therefore, if transmittance is 10% or less for light in the wavelength range of 420 nm or less, in light leaking from indoors to outdoors through the light control window, insects can be prevented from being attracted to the surface of the light control window exposed to the outside.

However, light in the wavelength range of 420 nm or less includes blue light and violet light in the visible region, and therefore, light that has passed through the light control window from indoors to outdoors tends to have a yellowish tinge. Thus, when a person indoors views the light control window, the person tends to perceive that the light control window has a yellowish tinge. In this regard, the light control window including the light control sheet 10 according to an embodiment of the present invention is formed such that light that has passed through the light control window from indoors to outdoors has a yellowness index YI of 10 or less, and therefore, a person indoors is less likely to perceive that the light control window has a yellowish tinge.

The standard light source D65 is prescribed in "Standard illuminants and sources for colorimetry", JIS Z 8720: 2012. The yellowness index YI of Condition 2 is a value calculated using a calculation method prescribed in "Plastics—Determination of yellowness index and change of yellowness index", JIS K 7373: 2006.

The light control window is preferred to satisfy at least one of the following Conditions 3 to 6. In other words, the light control window may satisfy any one of Conditions 3 to 6 or may satisfy two or more of Conditions 3 to 6.

Condition 3: When the light control layer 12 is in a transparent state, light from the standard light source D65 that has passed through the light control window in the second direction D2 has a Y value of 70% or more prescribed in JIS Z 8781-1: 2012.

Condition 4: When the light control layer 12 is in a transparent state or in an opaque state, reflectance is 10% or less for light in the wavelength range of 420 nm or less incident on the light control window in the first direction D1.

Condition 5: When the yellowness index YI of the light control layer 12 in a transparent state is subtracted from the yellowness index YI thereof in an opaque state, the difference is 0.2 or less.

Condition 6: Transmittance is 10% or less for light in the wavelength range of 620 nm or more incident on the light control window in the first direction D1.

When Condition 3 is satisfied, the Y value of light that has passed through the light control window from outdoors to indoors is 70% or more, and therefore, when a person indoors views the light control window, the person is less likely to perceive that the light control window is dark. Also, when the person looks outdoors from indoors, deterioration in visibility can be reduced.

When Condition 4 is satisfied, reflectance becomes low for light to which insects have high visual sensitivity, in light incident on the light control sheet 10 from outdoors to indoors, and therefore, insects are further prevented from being attracted to the light control window.

When Condition 5 is satisfied, the difference in the yellowness index YI is 0.2 or less, and therefore, this can reduce variation in yellowness of the light control window due to the difference in state of the light control layer 12.

When Condition 6 is satisfied and if a person indoors views the light control window, the person may be less likely to perceive that the light control window has a yellowish tinge.

The Y value of Condition 3 is calculated using a calculation method prescribed in "Colorimetry—Part 1: CIE standard colorimetric observers", JIS Z 8781-1: 2012. The transmittance of Condition 6 is a total light transmittance and is measured based on a method according to JIS K 7361-1: 1997.

From the perspective of the light control window satisfying Condition 1, the filter included in the light control window can contain a colorant as described above. The colorant may be a colorant with an absorption wavelength band in the wavelength range of 420 nm or less. The filter may contain only one colorant or may contain two or more colorants. The colorant may be at least one selected from triazine compounds, benzophenone compounds, benzotriazole compounds, and cyanoacrylate compounds, for example. In other words, the filter may contain only one colorant or two or more colorants selected from this group. If the filter contains two or more colorants, these colorants may be of the same family, or may be of a first family and of a second family different from the first family.

From the perspective of the light control window satisfying Condition 6, the filter included in the light control window can contain a colorant. The colorant may be a colorant with an absorption wavelength band in the wavelength range of 620 nm or more. The filter may contain only one colorant or may contain two or more colorants.

The colorant may, for example, be a chromatic colorant, and the chromatic colorant may, for example, be a blue pigment. Examples of the blue pigment may include monoazo blue pigments, and methine or polymethine blue pigments. The colorant may, for example, be an infrared absorber. Examples of the infrared absorber may include cyanine compounds, phthalocyanine compounds, squarylium compounds, croconium compounds, diimmonium compounds, perylene compounds, and pyrrolopyrrole compounds. From the perspective of the light control window satisfying Condition 6, the filter included in the light control window may contain both of a chromatic colorant and an infrared absorber.

If the liquid crystal layer 23 provides a filter, the resin layer included in the liquid crystal layer 23 may contain the colorants mentioned above.

Examples

Referring to FIGS. 6 to 22 and Tables 1 to 4, some examples and comparative examples will be described.

Of FIGS. 6 to 22, FIGS. 6, 8, 10, 12, 14, 16, 18, 20 and 22 each show transmittance spectra of the light control window. Transmittance in each transmittance spectrum is a total light transmittance. In each of these figures, the solid line indicates a spectrum in the case where a normal type light control window is in an opaque state with a voltage of 0 V applied to the light control layer, and the dash line indicates a spectrum in the case where the normal type light control window is in a transparent state with a voltage of 40 V applied to the light control layer. Also, the dash-dot line indicates a spectrum in the case where a reverse type light control window is in a transparent state with a voltage of 0 V applied to the light control layer, and the dash-dot-dot line indicates a spectrum in the case where the reverse type light control window is in an opaque state with a voltage of 40 V applied to the light control layer.

In contrast, FIGS. 7, 9, 11, 13, 15, 17, 19 and 21 each show a transmittance spectrum of the first filter included in the light control window. Transmittance in each transmittance spectrum is a total light transmittance.

Figure 6:
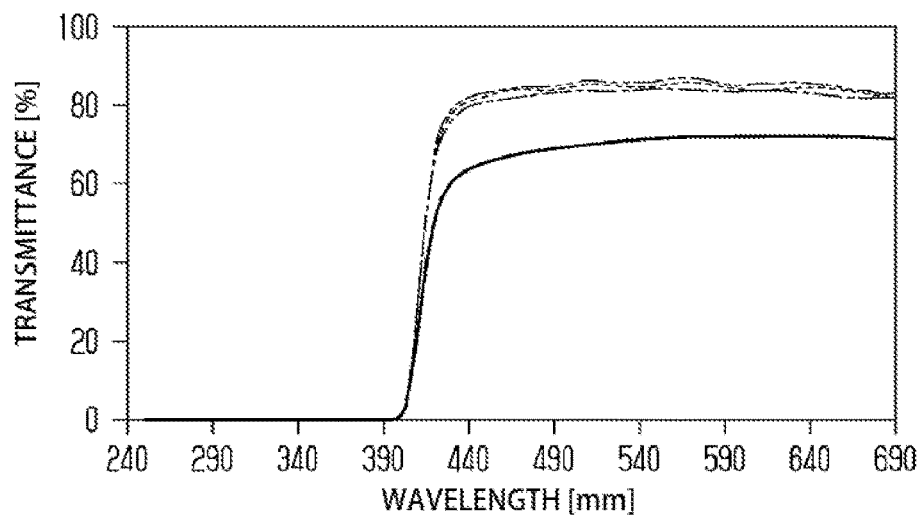
FIG. 6 is a graph showing transmission spectra of the light control windows of Comparative Examples 1-1 and 2-1.
Figure 7:
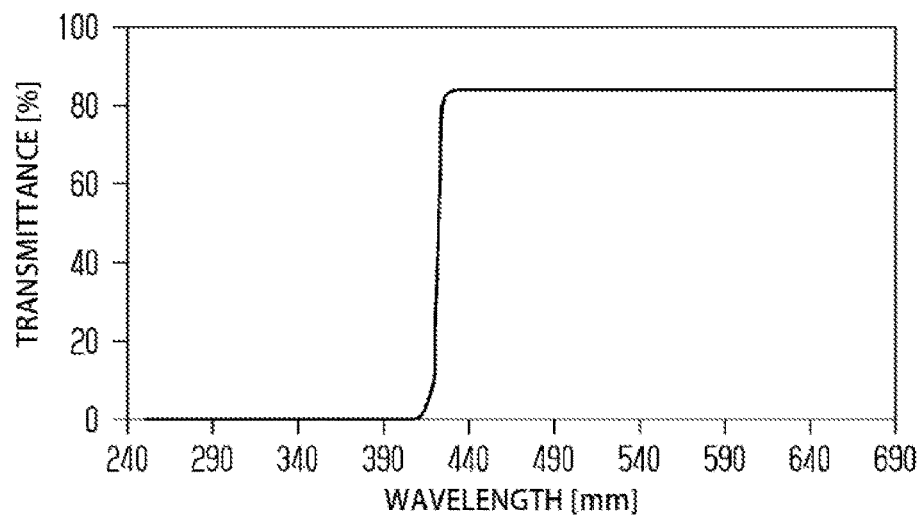
FIG. 7 is a graph showing a transmission spectrum of a first filter included in the light control windows of Comparative Example 1-3 and Example 2-1.
Figure 8:
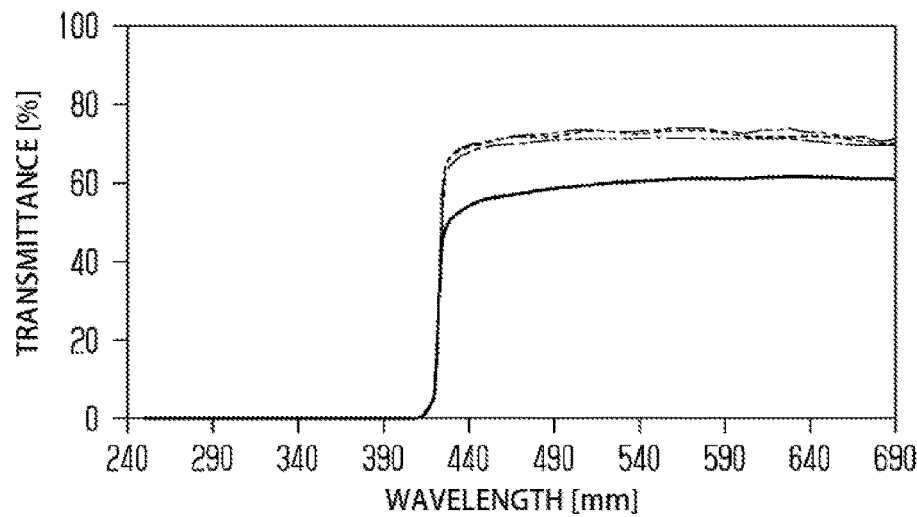
FIG. 8 is a graph showing transmission spectra of the light control windows of Comparative Example 1-3 and Example 2-1.
Figure 9:
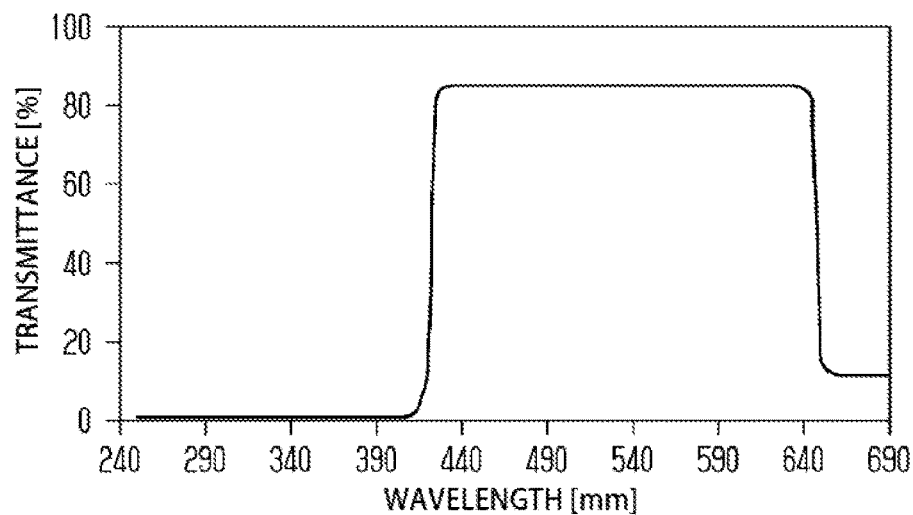
FIG. 9 is a graph showing a transmission spectrum of a first filter included in the light control windows of Examples 1-1 and 2-2.
Figure 10:
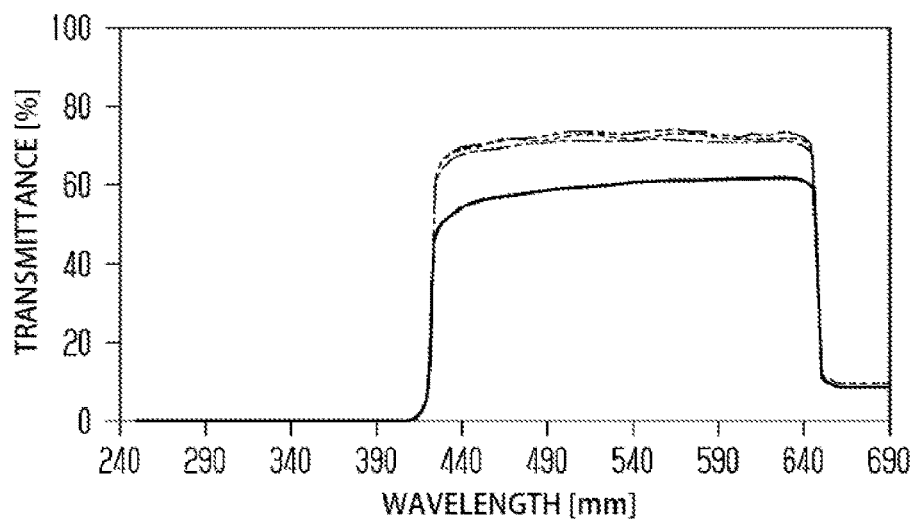
FIG. 10 is a graph showing transmission spectra of the light control windows of Examples 1-1 and 2-2.

FIG. 6 shows transmission spectra of the light control windows of Comparative Examples 1-1 and 2-1. FIG. 7 shows a transmittance spectrum of the first filter included in the light control windows of Comparative Example 1-3 and Example 2-1, and FIG. 8 shows transmittance spectra of the light control windows of Comparative Example 1-3 and Example 2-1. FIG. 9 shows a transmittance spectrum of the first filter included in the light control windows of Examples 1-1 and 2-2, and FIG. 10 shows transmittance spectra of the light control windows of Examples 1-1 and 2-2.

Figure 11:
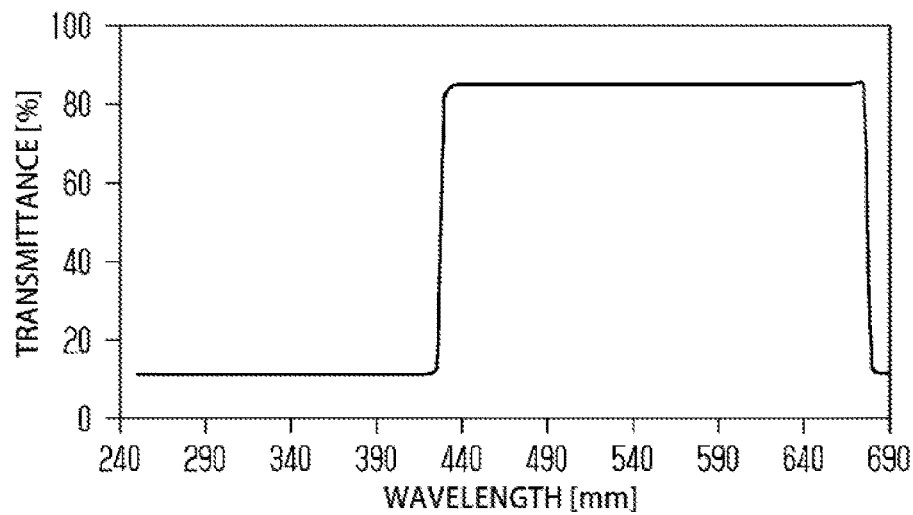
FIG. 11 is a graph showing a transmission spectrum of a first filter included in the light control windows of Comparative Examples 1-5 and 2-4.
Figure 12:
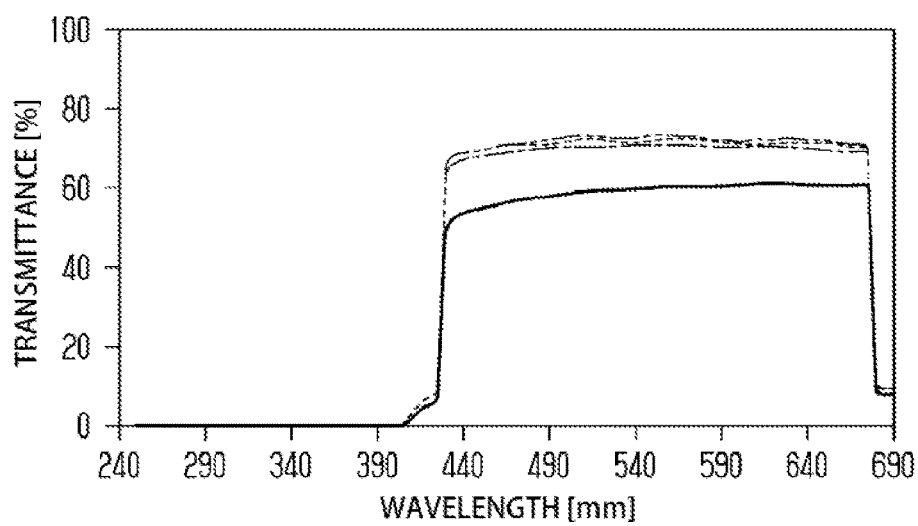
FIG. 12 is a graph showing transmission spectra of the light control windows of Comparative Examples 1-5 and 2-4.
Figure 13:
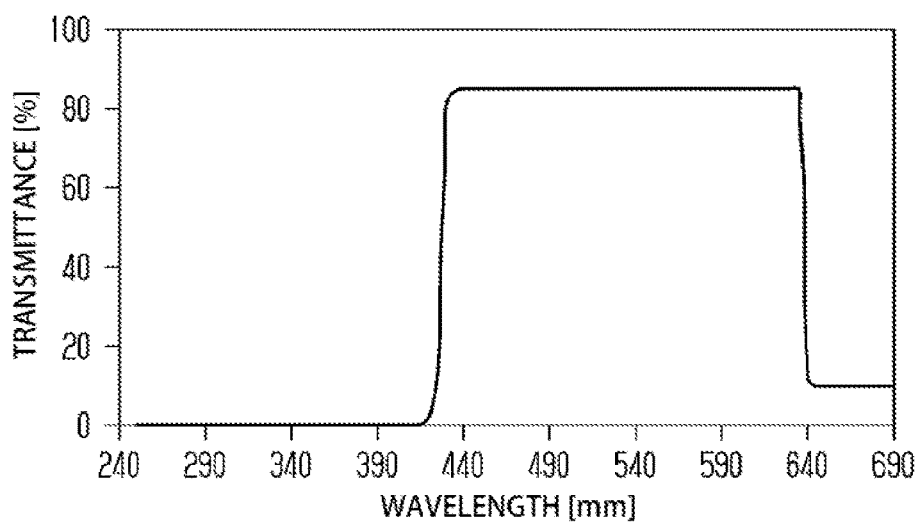
FIG. 13 is a graph showing a transmission spectrum of a first filter included in the light control windows of Examples 1-2 and 2-3.
Figure 14:
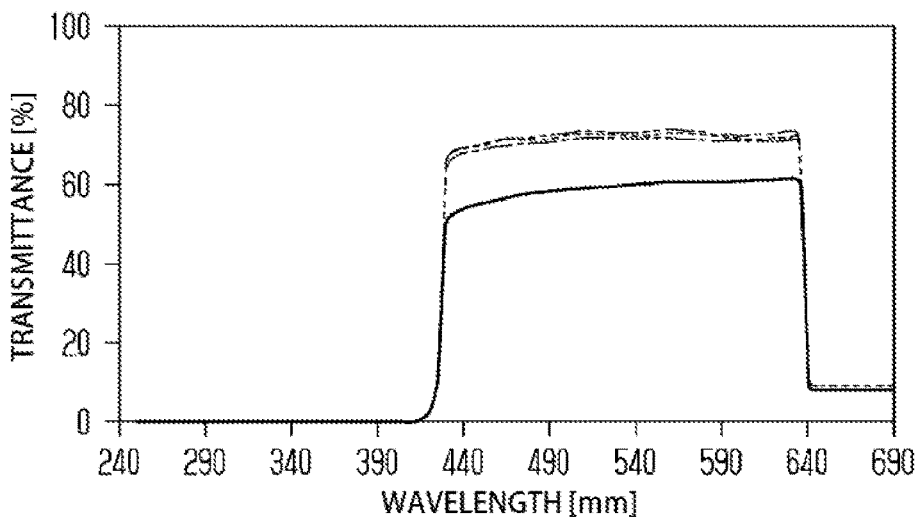
FIG. 14 is a graph showing transmission spectra of the light control windows of Examples 1-1 and 2-3.

FIG. 11 shows a transmittance spectrum of the first filter included in the light control windows of Comparative Examples 1-5 and 2-4, and FIG. 12 shows transmittance spectra of the light control windows of Comparative Examples 1-5 and 2-4. FIG. 13 shows a transmittance spectrum of the first filter included in the light control windows of Examples 1-2 and 2-3, and FIG. 14 shows transmittance spectra of the light control windows of Examples 1-2 and 2-3.

Figure 15:
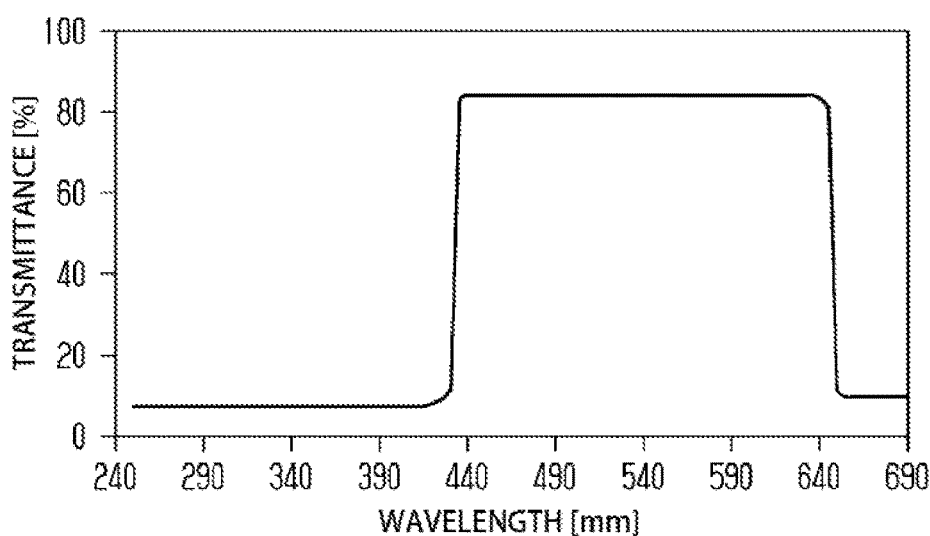
FIG. 15 is a graph showing a transmission spectrum of a first filter included in the light control windows of Comparative Examples 1-7 and 2-6.
Figure 16:
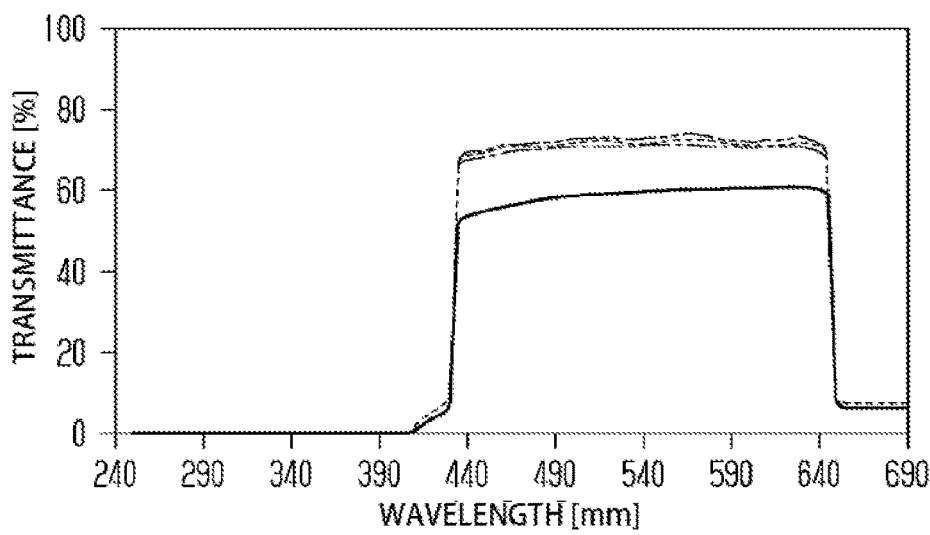
FIG. 16 is a graph showing transmission spectra of the light control windows of Comparative Examples 1-7 and 2-6.
Figure 17:
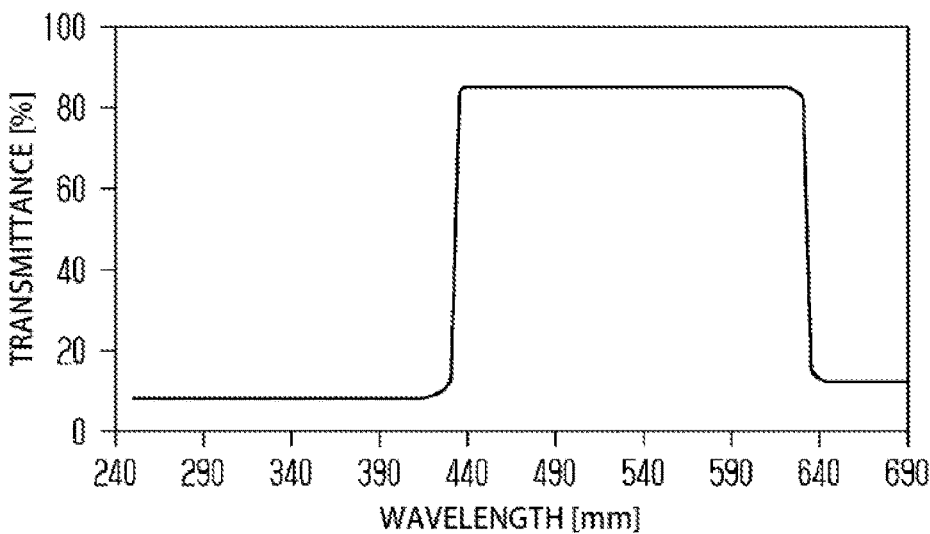
FIG. 17 is a graph showing a transmission spectrum of a first filter included in the light control windows of Examples 1-3 and 2-4.
Figure 18:
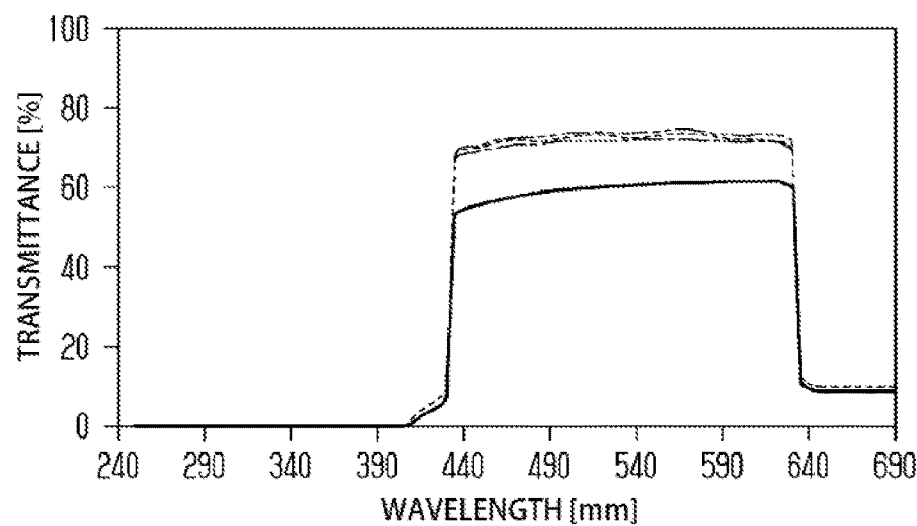
FIG. 18 is a graph showing transmission spectra of the light control windows of Examples 1-3 and 2-4.

FIG. 15 shows a transmittance spectrum of the first filter included in the light control windows of Comparative Examples 1-7 and 2-6, and FIG. 16 shows transmittance spectra of the light control windows of Comparative Examples 1-7 and 2-6. FIG. 17 shows a transmittance spectrum of the first filter included in the light control windows of Examples 1-3 and 2-4, and FIG. 18 shows transmittance spectra of the light control windows of Examples 1-3 and 2-4.

Figure 19:
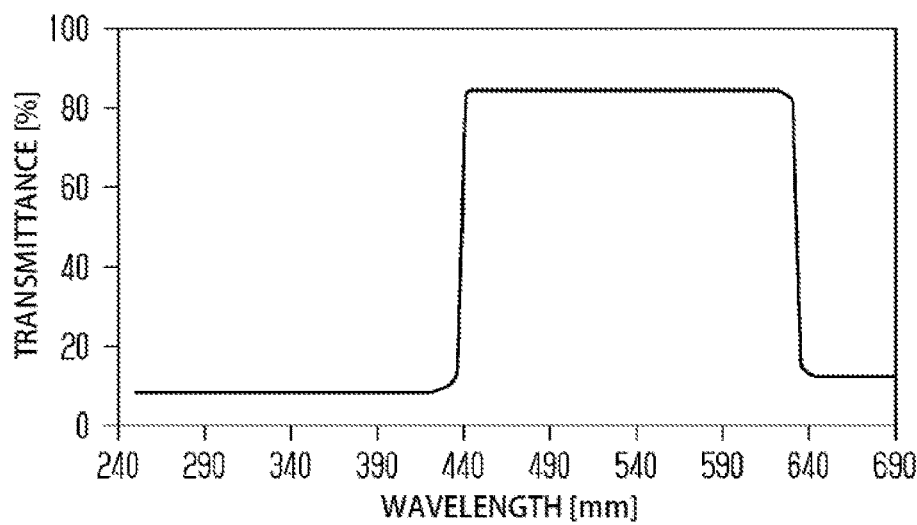
FIG. 19 is a graph showing a transmission spectrum of a first filter included in the light control windows of Comparative Examples 1-9 and 2-8.
Figure 20:
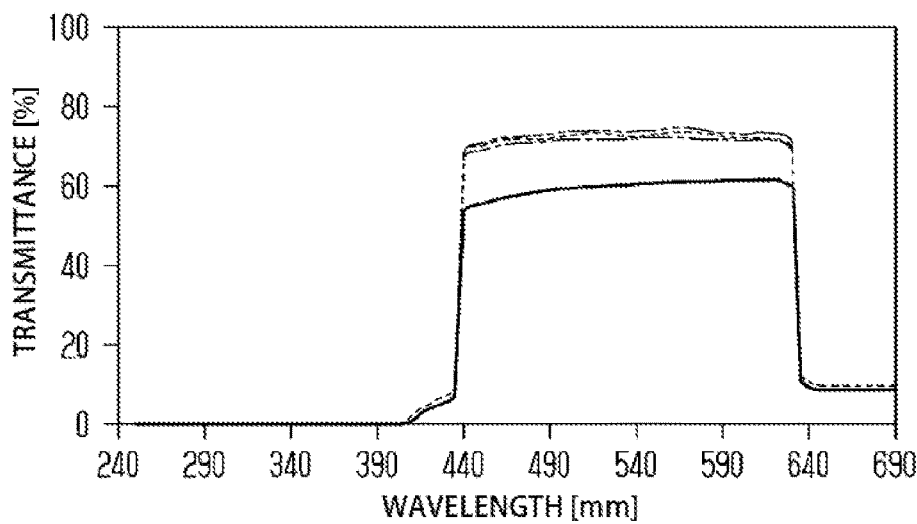
FIG. 20 is a graph showing transmission spectra of the light control windows of Comparative Examples 1-9 and 2-8.
Figure 21:
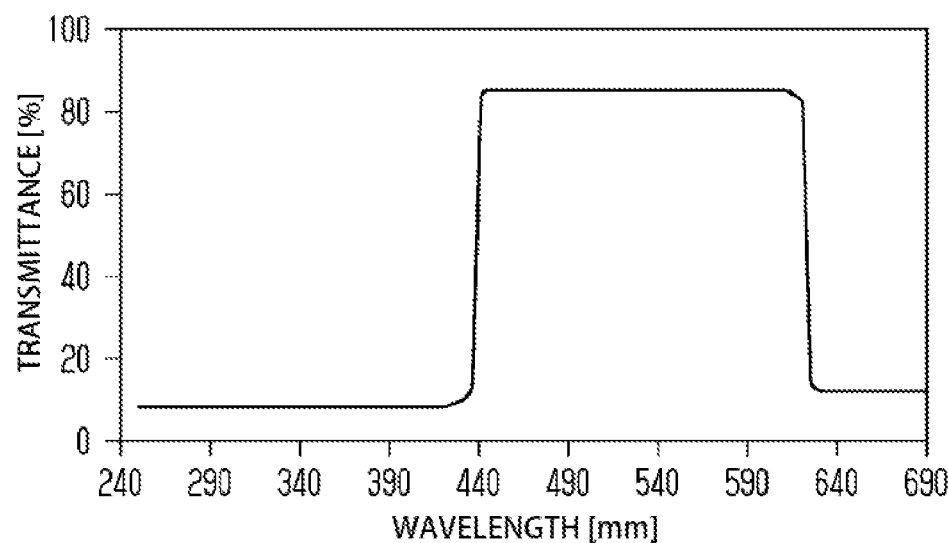
FIG. 21 is a graph showing a transmission spectrum of a first filter included in the light control windows of Examples 1-4 and 2-5.
Figure 22:
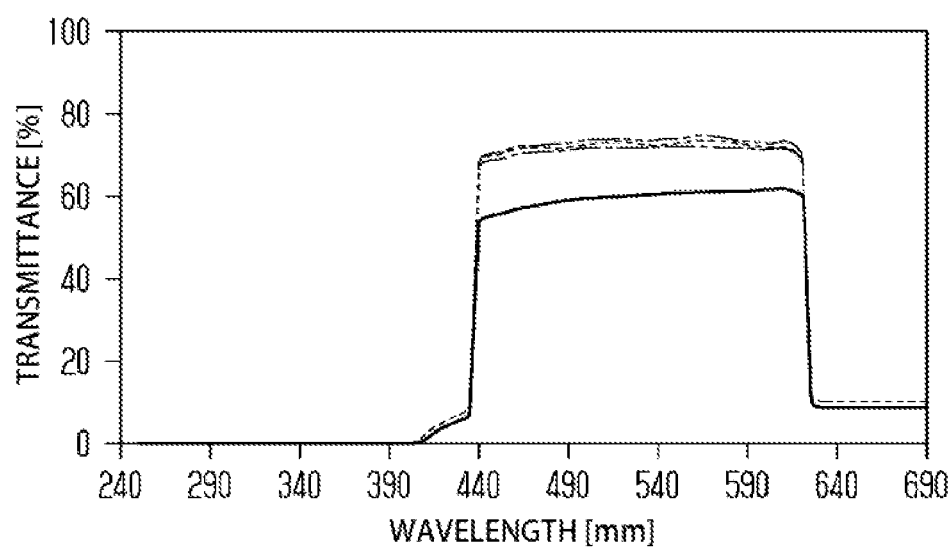
FIG. 22 is a graph showing transmission spectra of the light control windows of Examples 1-4 and 2-5.

FIG. 19 shows a transmittance spectrum of the first filter included in the light control windows of Comparative Examples 1-9 and 2-8, and FIG. 20 shows transmittance spectra of the light control windows of Comparative Examples 1-9 and 2-8. FIG. 21 shows a transmittance spectrum of the first filter included in the light control windows of Examples 1-4 and 2-5, and FIG. 22 shows transmittance spectra of the light control windows of Examples 1-4 and 2-5.

Normal Type Light Control Window

A soda lime glass plate with a thickness of 3 mm was prepared as the transparent material. A normal type light control sheet including an adhesive layer containing a UV absorber and a light control layer was prepared as the light control sheet. A light control layer including a liquid crystal layer, two transparent electrode layers, two transparent substrates, a UV absorption layer, and a hard coat layer was prepared as the light control layer. Of the two transparent substrates, one was attached to the transparent material via the adhesive layer and, on the other transparent substrate, the UV absorption layer was laminated and the hard coat layer was laminated on the UV absorption layer.

A liquid crystal layer containing multiple domains with a liquid crystal composition filled therein was prepared as the liquid crystal layer. Transparent electrode layers formed of ITO were prepared as the two transparent electrode layers. Transparent substrates formed of PET were prepared as the transparent substrates.

Multiple first filters were designed and the optical characteristics of normal type light control windows including these respective first filters were calculated through simulations. Wavelength range absorbed by each of the light control windows and light resistance of each of these light control windows were shown in Table 1. Of the following examples and comparative examples, the light control window of Comparative Example 1-1 included no first filter. In contrast, the light control windows of the comparative examples other than Comparative Example 1-1 and the light control windows of all the examples included respective first filters.

For example, the light control window of Comparative Example 1-5, which included a first filter exhibiting the transmittance spectrum shown in FIG. 11, exhibited the transmittance spectra shown in FIG. 12. Also, the light control window of Comparative Example 1-7, which included a first filter exhibiting the transmittance spectrum shown in FIG. 15, exhibited the transmittance spectra shown in FIG. 16. Furthermore, the light control window of Comparative Example 1-9, which included a first filter exhibiting the transmittance spectrum shown in FIG. 19, exhibited the transmittance spectra shown in FIG. 20.

TABLE 1

|  | Absorption wavelength Opaque state | | | |
| --- | --- | --- | --- | --- |
|  |  | Transmittance of 10% or less | | |
|  | Transmittance of 1% or less ≤380 nm | Short wavelength side | Long wavelength side | Light resistance No yellowing |
| Comp. Ex. 1-1 | Satisfied | ≤405 nm | — | Satisfied |
| Comp. Ex. 1-2 | Satisfied | ≤415 nm | — | Satisfied |
| Comp. Ex. 1-3 | Satisfied | ≤420 nm | — | Satisfied |
| Ex. 1-1 | Satisfied | ≤420 nm | ≥655 nm | Satisfied |
| Comp. Ex. 1-4 | Satisfied | ≤425 nm | — | Satisfied |
| Comp. Ex. 1-5 | Satisfied | ≤425 nm | ≥680 nm | Satisfied |
| Ex. 1-2 | Satisfied | ≤425 nm | ≥640 nm | Satisfied |
| Comp. Ex. 1-6 | Satisfied | ≤430 nm | — | Satisfied |
| Comp. Ex. 1-7 | Satisfied | ≤430 nm | ≥650 nm | Satisfied |
| Ex. 1-3 | Satisfied | ≤430 nm | ≥640 nm | Satisfied |
| Comp. Ex. 1-8 | Satisfied | ≤435 nm | — | Satisfied |
| Comp. Ex. 1-9 | Satisfied | ≤435 nm | ≥640 nm | Satisfied |
| Ex. 1-4 | Satisfied | ≤435 nm | ≥625 nm | Satisfied |
| Ex. 1-5 | Not satisfied | ≤420 nm | ≥655 nm | Not satisfied |

As shown in Table 1, the light control windows of Examples 1-1 to 1-4 and Comparative Examples 1-1 to 1-9 each had a transmittance of 1% or less in the wavelength range of 380 nm or less. Thus, in the light control windows of Examples 1-1 to 1-4 and Comparative Examples 1-1 to 1-9, UV light incident on the light control windows could be reduced, by which yellowing of the light control sheets could be reduced.

Compared to the light control window of Comparative Example 1-1, the light control windows of Comparative Examples 1-2 to 1-4, 1-6 and 1-8 were each combined with a first filter absorbing only light in the short wavelength region of the visible region. Thus, the light control windows of Comparative Examples 1-2 to 1-4, 1-6 and 1-8 each had a transmittance of 10% or less for light in the short wavelength region of the visible region. For example, the light control window of Comparative Example 1-3, which included a first filter exhibiting the transmittance spectrum shown in FIG. 7, exhibited the transmittance spectra shown in FIG. 8.

In contrast, compared to the light control window of Comparative Example 1-1, the light control windows of Comparative Examples 1-5, 1-7 and 1-9 were each combined with a first filter absorbing light in the short wavelength range in the visible region and light in the long wavelength region of the visible region. Thus, the light control windows of Comparative Examples 1-5, 1-7 and 1-9 each had a transmittance of 10% or less for light in the short wavelength region of the visible region and light in the long wavelength region of the visible region.

On the other hand, compared to the light control window of Comparative Example 1-1, the light control windows of Examples 1-1 to 1-5 were each combined with a first filter absorbing light in the short wavelength region of the visible region and light in the long wavelength region of the visible region. Thus, the light control windows of Examples 1-1 to 1-5 each had a transmittance of 10% or less for light in the short wavelength region of the visible region and light in the long wavelength region of the visible region.

For example, the light control window of Example 1-1, which included a first filter exhibiting the transmittance spectrum shown in FIG. 9, exhibited the transmittance spectra shown in FIG. 10. The light control window of Example 1-2, which included a first filter exhibiting the transmittance spectrum shown in FIG. 13, exhibited the transmittance spectra shown in FIG. 14. The light control window of Example 1-3, which included a first filter exhibiting the transmittance spectrum shown in FIG. 17, exhibited the transmittance spectra shown in FIG. 18. The light control window of Example 1-4, which included a first filter exhibiting the transmittance spectrum shown in FIG. 21, exhibited the transmittance spectra shown in FIG. 22.

In the normal type light control windows, transmittance for light in the wavelength range of 420 nm or less, yellowness index YI, Y value, and reflectance for light in the wavelength range of 420 nm or less were as shown in Table 2.

TABLE 2

| | Light transmission (Indoors to outdoors) | | Light transmission (Outdoors to indoors) | | | Light reflection (Outdoors to Outdoors) | |
|---|---|---|---|---|---|---|---|
| | Opaque state ≤420 nm ≤10 | Transparent state ≤420 nm ≤10 | Opaque state Yellowness index ≤10 | Transparent state Yellowness index ≤10 | Y value | Opaque state ≤420 nm ≤10 | Transparent state ≤420 nm ≤10 |
| Comp. Ex. 1-1 | Not satisfied | Not satisfied | 10.9 | 4.6 | 85.4 | Satisfied | Satisfied |
| Comp. Ex. 1-2 | Not satisfied | Not satisfied | 11.8 | 5.6 | 72.6 | Satisfied | Satisfied |
| Comp. Ex. 1-3 | Satisfied | Satisfied | 13.5 | 7.6 | 72.6 | Satisfied | Satisfied |
| Ex. 1-1 | Satisfied | Satisfied | 9.1 | 3.1 | 71.6 | Satisfied | Satisfied |
| Comp. Ex. 1-4 | Satisfied | Satisfied | 16.1 | 10.4 | 72.6 | Satisfied | Satisfied |
| Comp. Ex. 1-5 | Satisfied | Satisfied | 15.6 | 9.9 | 72.5 | Satisfied | Satisfied |
| Ex. 1-2 | Satisfied | Satisfied | 8.2 | 2.6 | 70.9 | Satisfied | Satisfied |
| Comp. Ex. 1-6 | Satisfied | Satisfied | 19.8 | 14.5 | 72.5 | Satisfied | Satisfied |
| Comp. Ex. 1-7 | Satisfied | Satisfied | 15.3 | 10.0 | 71.6 | Satisfied | Satisfied |
| Ex. 1-3 | Satisfied | Satisfied | 9.5 | 4.3 | 70.3 | Satisfied | Satisfied |
| Comp. Ex. 1-8 | Satisfied | Satisfied | 24.9 | 19.9 | 72.5 | Satisfied | Satisfied |
| Comp. Ex. 1-9 | Satisfied | Satisfied | 14.7 | 9.9 | 72.5 | Satisfied | Satisfied |
| Ex. 1-4 | Satisfied | Satisfied | 8.2 | 3.4 | 68.8 | Satisfied | Satisfied |
| Ex. 1-5 | Satisfied | Satisfied | 9.1 | 3.1 | 71.6 | Satisfied | Satisfied |

As shown in Table 2, the light control windows of Examples 1-1 to 1-5 and Comparative Examples 1-3 to 1-9 each had a reflectance of 10% or less for light in the wavelength range of 420 nm or less, irrespective of the state of the light control window, and therefore, insects could be prevented from being attracted in both the transparent and opaque states. In contrast, the light control windows of Comparative Examples 1-1 and 1-2 each had a transmittance exceeding 10% for light in the wavelength range of 420 nm or less, irrespective of the state of the light control window, and therefore, insects could be attracted in both the transparent and opaque states.

On the other hand, the light control windows of Comparative Examples 1-3 to 1-9 each had a yellowness index YI exceeding 10 in at least one of the opaque and transparent states of the light control window. Therefore, when a person indoors views the light control windows of Comparative Examples 1-3 to 1-9, the person may tend to perceive that the light control windows have a yellowish tinge. In contrast, the light control windows of Examples 1-1 to 1-5 each had a yellowness index YI of 10 or less, irrespective of the state of the light control window. Therefore, when a person indoors views the light control windows of Examples 1-1 to 1-5, the person is less likely to perceive that the light control windows have a yellowish tinge.

The light control windows of Examples 1-1 to 1-3 and 1-5 each had a Y value of 70% or more for standard light passing from outdoors to indoors when the light control window is in a transparent state. In contrast, the light control window of Example 1-4 had a Y value of less than 70% for standard light passing from outdoors to indoors when the light control window is in a transparent state. Therefore, when a person indoors views the light control windows of Examples 1-1 to 1-3 and 1-5, the person is less likely to perceive that the light control windows are dark, compared to the light control window of Example 1-4.

The light control windows of Examples 1-1 to 1-5 and Comparative Examples 1-1 to 1-9 each had a reflectance of 10% or less in the wavelength range of 420 nm or less, in light incident on the light control window from outdoors. Therefore, light reflected on these light control windows was less likely to attract insects thereto.

Reverse Type Light Control Window

A soda lime glass plate with a thickness of 3 mm was prepared as the transparent material. A reverse type light control sheet including an adhesive layer containing a UV absorber and a light control layer was prepared as the light control sheet. A light control layer including a liquid crystal layer, two alignment layers, two transparent electrode layers, two transparent substrates, a UV absorption layer, and a hard coat layer was prepared as the light control sheet. Of the two transparent substrates, one was attached to the transparent material via the adhesive layer and, on the other transparent substrate, the UV absorption layer was laminated and the hard coat layer was laminated on the UV absorption layer.

A liquid crystal layer containing multiple domains with a liquid crystal composition filled therein was prepared as the liquid crystal layer. Transparent electrode layers formed of ITO were prepared as the two transparent electrode layers. Transparent substrates formed of PET were prepared as the transparent substrates. Alignment layers formed of polyimide were prepared as the two alignment layers.

Multiple first filters were designed and the optical characteristics of reverse type light control windows including these respective first filters were calculated through simulations. The wavelength range absorbed by each of the light control windows and light resistance of each of these light control windows were as shown in Table 3. Of the following examples and comparative examples, the light control window of Comparative Example 2-1 included no first filter. In contrast, the light control windows of the comparative examples other than Comparative Example 2-1 and the light control windows of all the examples included respective first filters.

As shown in Table 3 below, each reverse type light control window included the same first filter as the first filter provided to one of the normal type light control windows described above.

TABLE 3

|  | Same first filter | Absorption wavelength Opaque state | | | |
|---|---|---|---|---|---|
|  |  | Transmittance of 1% or less ≤380 nm | Transmittance of 10% or less | | Light resistance No yellowing |
|  |  |  | Short wavelength side | Long wavelength side |  |
| Comp. Ex. 2-1 | C. Ex. 1-1 | Satisfied | ≤405 nm | — | Satisfied |
| Comp. Ex. 2-2 | C. Ex. 1-2 | Satisfied | ≤415 nm | — | Satisfied |
| Ex. 2-1 | C. Ex. 1-3 | Satisfied | ≤420 nm | — | Satisfied |
| Ex. 2-2 | Ex. 1-1 | Satisfied | ≤420 nm | ≥655 nm | Satisfied |
| Comp. Ex. 2-3 | C. Ex. 1-4 | Satisfied | ≤425 nm | — | Satisfied |
| Comp. Ex. 2-4 | C. Ex. 1-5 | Satisfied | ≤425 nm | ≥680 nm | Satisfied |
| Ex. 2-3 | Ex. 1-2 | Satisfied | ≤425 nm | ≥640 nm | Satisfied |
| Comp. Ex. 2-5 | C. Ex. 1-6 | Satisfied | ≤430 nm | — | Satisfied |
| Comp. Ex. 2-6 | C. Ex. 1-7 | Satisfied | ≤430 nm | ≥650 nm | Satisfied |
| Ex. 2-4 | Ex. 1-3 | Satisfied | ≤430 nm | ≥640 nm | Satisfied |
| Comp. Ex. 2-7 | C. Ex. 1-8 | Satisfied | ≤435 nm | — | Satisfied |
| Comp. Ex. 2-8 | C. Ex. 1-9 | Satisfied | ≤435 nm | ≥640 nm | Satisfied |
| Ex. 2-5 | Ex. 1-4 | Satisfied | ≤435 nm | ≥625 nm | Satisfied |
| Ex. 2-6 | Ex. 1-5 | Not satisfied | ≤420 nm | ≥655 nm | Not satisfied |

As shown in Table 3, the light control windows of Examples 2-1 to 2-5 and Comparative Examples 2-1 to 2-8 each had a transmittance of 1% or less in the wavelength range of 380 nm or less. Thus, in the light control windows of Examples 2-1 to 2-5 and Comparative Examples 2-1 to 2-8, UV light incident on the light control windows could be reduced, by which yellowing of the light control sheets could be reduced.

Compared to the light control window of Comparative Example 2-1, the light control windows of Comparative Examples 2-2, 2-3, 2-5 and 2-7 were each combined with a first filter absorbing only light in the short wavelength region of the visible region. Thus, the light control windows of Comparative Examples 2-2, 2-3, 2-5 and 2-7 each had a transmittance of 10% or less for light in the short wavelength region of the visible region.

Compared to the light control window of Comparative Example 2-1, the light control window of Example 2-1 was combined with a first filter absorbing only light in the short wavelength region of the visible region. Thus, the light control window of Example 2-1 had a transmittance of 10% or less for light in the short wavelength region of the visible region. For example, the light control window of Example 2-1, which included a first filter exhibiting the transmittance spectrum shown in FIG. 7, exhibited the transmittance spectra shown in FIG. 8.

In contrast, compared to the light control window of Comparative Example 2-1, the light control windows of Comparative Examples 2-4, 2-6 and 2-8 were each combined with a first filter absorbing light in the short wavelength region of the visible region and light in the long wavelength region of the visible region. Thus, the light control windows of Comparative Examples 2-4, 2-6 and 2-8 each had a transmittance of 10% or less for light in the short wavelength region of the visible region and light in the long wavelength region of the visible region.

For example, the light control window of Comparative Example 2-4, which included a first filter exhibiting the transmittance spectrum shown in FIG. 11, exhibited the transmittance spectra shown in FIG. 12. Furthermore, the light control window of Comparative Example 2-6, which included a first filter exhibiting the transmittance spectrum shown in FIG. 15, exhibited the transmittance spectra shown in FIG. 16. Furthermore, the light control window of Comparative Example 2-8, which included a first filter exhibiting the transmittance spectrum shown in FIG. 19, exhibited the transmittance spectra shown in FIG. 20.

On the other hand, compared to the light control window of Comparative Example 2-1, the light control windows of Examples 2-2 to 2-6 were each combined with a first filter absorbing light in the short wavelength region of the visible region and light in the long wavelength region of the visible region. Thus, the light control windows of Examples 2-2 to 2-6 each had a transmittance of 10% or less for light in the short wavelength region of the visible region and light in the long wavelength region of the visible region.

For example, the light control window of Example 2-2, which included a first filter exhibiting the transmittance spectrum shown in FIG. 9, exhibited the transmittance spectra shown in FIG. 10. The light control window of Example 2-3, which included a first filter exhibiting the transmittance spectrum shown in FIG. 13, exhibited the transmittance spectra shown in FIG. 14. The light control window of Example 2-4, which included a first filter exhibiting the transmittance spectrum shown in FIG. 17, exhibited the transmittance spectra shown in FIG. 18. The light control window of Example 2-5, which included a first filter exhibiting the transmittance spectrum shown in FIG. 21, exhibited the transmittance spectra shown in FIG. 22.

In the reverse type light control windows, transmittance for light in the wavelength range of 420 nm or less, yellowness index YI, Y value, and reflectance for light in the wavelength range of 420 nm or less were as shown in Table 4.

TABLE 4

| | Light transmission (Indoors to outdoors) | | Light transmission (Outdoors to indoors) | | | Light reflection (Outdoors to Outdoors) | |
|---|---|---|---|---|---|---|---|
| | Opaque state ≤420 nm ≤10 | Transparent state ≤420 nm ≤10 | Opaque state Yellowness index ≤10 | Transparent state Yellowness index ≤10 | Y value | Opaque state ≤420 nm ≤10 | Transparent state ≤420 nm ≤10 |
| Comp. Ex. 2-1 | Not satisfied | Not satisfied | 5.4 | 5.2 | 86.5 | Satisfied | Satisfied |
| Comp. Ex. 2-2 | Not satisfied | Not satisfied | 6.4 | 6.2 | 73.5 | Satisfied | Satisfied |
| Ex. 2-1 | Satisfied | Satisfied | 8.3 | 8.1 | 73.5 | Satisfied | Satisfied |
| Ex. 2-2 | Satisfied | Satisfied | 3.9 | 3.7 | 72.6 | Satisfied | Satisfied |
| Comp. Ex. 2-3 | Satisfied | Satisfied | 11.1 | 10.9 | 73.5 | Satisfied | Satisfied |
| Comp. Ex. 1-4 | Satisfied | Satisfied | 10.6 | 10.5 | 73.4 | Satisfied | Satisfied |
| Ex. 2-3 | Satisfied | Satisfied | 3.4 | 3.2 | 71.8 | Satisfied | Satisfied |
| Comp. Ex. 2-5 | Satisfied | Satisfied | 15.2 | 15.0 | 73.5 | Satisfied | Satisfied |
| Comp. Ex. 2-6 | Satisfied | Satisfied | 10.7 | 10.6 | 72.5 | Satisfied | Satisfied |
| Ex. 2-4 | Satisfied | Satisfied | 5.0 | 4.8 | 71.2 | Satisfied | Satisfied |
| Comp. Ex. 2-7 | Satisfied | Satisfied | 20.5 | 20.4 | 73.4 | Satisfied | Satisfied |
| Comp. Ex. 2-8 | Satisfied | Satisfied | 10.5 | 10.4 | 73.4 | Satisfied | Satisfied |
| Ex. 2-5 | Satisfied | Satisfied | 4.1 | 3.9 | 69.7 | Satisfied | Satisfied |
| Ex. 2-6 | Satisfied | Satisfied | 8.3 | 8.1 | 73.5 | Satisfied | Satisfied |

As shown in Table 4, the light control windows of Examples 2-1 to 2-6 and Comparative Examples 2-3 to 2-8 each had a reflectance of 10% or less for light in the wavelength range of 420 nm or less, irrespective of the state of the light control window, and therefore, insects could be prevented from being attracted in both the transparent and opaque states. In contrast, the light control windows of Comparative Examples 2-1 and 2-2 each had a transmittance exceeding 10% for light in the wavelength range of 420 nm or less, and therefore, insects could be attracted in both the transparent and opaque states.

On the other hand, the light control windows of Comparative Examples 2-3 to 2-8 each had a yellowness index YI exceeding 10, irrespective of the state of the light control window. Therefore, when a person indoors views the light control windows of Comparative Examples 2-3 to 2-8, the person may tend to perceive that the light control windows have a yellowish tinge. In contrast, the light control windows of Examples 2-1 to 2-6 each had a yellowness index YI of 10 or less, irrespective of the state of the light control window. Therefore, when a person indoors views the light control windows of Examples 2-1 to 2-6, the person is less likely to perceive that the light control windows have a yellowish tinge.

The light control windows of Examples 2-1 to 2-4 and 2-6 each had a Y value of 70% or more for standard light passing from outdoors to indoors when the light control window is in a transparent state. In contrast, the light control window of Example 2-5 had a Y value of less than 70% for standard light passing from outdoors to indoors when the light control window is in a transparent state. Therefore, when a person indoors views the light control windows of Examples 2-1 to 2-4 and 2-6, the person is less likely to perceive that the light control windows are dark, compared to the light control window of Example 2-5.

The light control windows of Examples 2-1 to 2-6 and Comparative Examples 2-1 to 2-8 each had a reflectance of 10% or less in the wavelength range of 420 nm or less, in light incident on the light control window from outdoors. Therefore, light reflected on these light control windows was less likely to attract insects thereto.

As described above, according to an embodiment of the light control sheet, the following effects can be achieved.

If transmittance is 10% or less for light in the wavelength range of 420 nm or less, in light leaking from indoors to outdoors through the light control window, insects can be prevented from being attracted to the surface of the light control window exposed to the outside.

It is formed such that light that has passed through the light control window from indoors to outdoors has a yellowness index YI of 10 or less, and therefore, a person indoors is less likely to perceive that the light control window has a yellowish tinge.

The Y value of light that has passed through the light control window from outdoors to indoors is 70% or more, and therefore, when a person indoors views the light control window, the person is less likely to perceive that the light control window is dark. Also, when the person looks outdoors from indoors, deterioration in visibility can be reduced.

Reflectance is low for light to which insects have high visual sensitivity, in light incident on the light control sheet 10 from outdoors to indoors, and therefore, insects are further prevented from being attracted to the light control window.

An example of a light control sheet includes two transparent conductive films, a liquid crystal layer located between the transparent conductive films, and a functional layer located on one side of one transparent conductive film facing away from the liquid crystal layer. Such light control sheets are formed to have a state in which haze is relatively high or a state in which haze is relatively low, depending on whether a voltage is applied to the light control sheets. The functional layer has a maximum transmittance of 1% or less in the wavelength range of 300 nm or more and 380 nm or less, and a yellowness index YI of 0 or greater and 10 or less. Light control sheets provided with such functional layers can reduce deterioration of the light control sheets due to light and yellowing of the light control sheets (e.g., see JP 2019-45612 A).

Light control sheets are applied to window glass for building windows. Thus, light control windows are formed, being provided with light control sheets and window glass. With such light control windows, indoor light leaks outdoors through the light control sheets and transparent materials, and therefore, the leaked light may attract insects to the light control windows. Attraction of insects may detract from the aesthetic appearance of the light control windows not only due to the insects flying around the light control windows but also due to the insects colliding with and sticking to the light control windows. Therefore, from the perspective of reducing detraction from the aesthetic appearance of the light control windows, attraction of insects to the light control windows is desired to be reduced. However, reducing attraction of insects may impair saturation of the light control windows. In particular, if the light control windows have a yellowish tinge, viewers of the light control windows may perceive that the aesthetic appearance of the light control windows is poor, although attraction of insects may be reduced.

A light control window according to an embodiment of the present invention includes a transparent material, and a light control sheet attached to the transparent material. The light control sheet includes an adhesive layer attached to the transparent material, and a light control layer attached to the transparent material via the adhesive layer, the light control layer having a transparent state or an opaque state depending on whether a voltage is applied to the light control layer. At least one of the adhesive layer and the light control layer includes a filter that absorbs part of light in the visible region. Transmittance is 10% or less for light with a wavelength range of 420 nm or less passing the light control window from the light control sheet toward the transparent material in a first direction; and light from a standard light source D65 that has passed through the light control window from the transparent material toward the light control sheet in a second direction has a yellowness index YI of 10 or less according to JIS K 7373: 2006.

Insects have high visual sensitivity to the UV region. Specifically, a peak of visual sensitivity of insects has an apex at approximately 360 nm and bottoms at approximately 250 nm and 420 nm. Therefore, if the light control sheet is attached to the surface exposed to the indoors, of the surfaces of the transparent material, transmittance may become 10% or less for light in the wavelength range of 420 nm or less, in light leaking from indoors to outdoors through the light control window, and therefore, insects are prevented from being attracted to the surface of the light control window exposed to the outside.

However, light in the wavelength range of 420 nm or less includes blue light and violet light in the visible region, and therefore, light that has passed through the light control window from indoors to outdoors tends to have a yellowish tinge. Thus, when a person indoors views the light control window, the person tends to perceive that the light control window has a yellowish tinge. In this regard, the above light control window is formed such that the light that has passed through the light control window from indoors to outdoors has a yellowness index YI of 10 or less, and therefore, a person indoors is less likely to perceive that the light control window has a yellowish tinge.

In the above light control window, when the light control layer is in the transparent state, light from the standard light source D65 that has passed through the light control window in the second direction may have a Y value of 70% or more according to JIS Z 8781-1: 2012.

According to the above light control window, if the light control sheet is attached to the surface exposed to the indoors, of the surfaces of the transparent material, light that has passed through the light control window from outdoors to indoors may have a Y value of 70% or more. Accordingly, when a person indoors views the light control window, the person may be less likely to perceive that the light control window is dark. Also, when the person looks outdoors from indoors, deterioration in visibility can be reduced.

In the above light control window, the adhesive layer may include a UV absorption layer; and transmittance may be 1% or less for light with a wavelength range of 380 nm or less passing through the light control window in the second direction. According to the light control window, light in the wavelength range of 380 nm or less incident on the light control sheet is absorbed by the adhesive layer. Thus, light resistance of the light control layer is enhanced.

In the above light control window, when the light control layer is in the transparent state or in the opaque state, reflectance may be 10% or less for light in the wavelength range of 420 nm or less incident on the light control window in the first direction.

According to the light control window, if the light control sheet is attached to the surface exposed to the indoors, of the surfaces of the transparent material, a low reflectance may be attained for light to which insects have high visual sensitivity, in light incident on the light control window from outdoors to indoors, and therefore, insects are further prevented from being attracted to the light control window.

In the above light control window, the transparent material may be formed of soda-lime glass.

In the above light control window, a difference obtained by subtracting the yellowness index YI when the light control layer is in the transparent state from the yellowness index YI when the light control layer is in the opaque state may be 0.2 or less. According to the light control window, the difference in the yellowness index YI is 0.2 or less, and therefore, variation in yellowness of the light control window due to the difference in state of the light control layer can be reduced.

In the above light control window, transmittance may be 10% or less for light with a wavelength range of 620 nm or more incident on the light control window in the first direction. According to the light control window, if a person indoors views the light control window, the person may be less likely to perceive that the light control window has a yellowish tinge.

In the above light control window, the adhesive layer may provide a filter. According to the light control window, the adhesive layer can have both the function of attaching the light control layer to the transparent material and the function of a filter.

In the above light control window, the light control layer may include a first transparent electrode layer, a second transparent electrode layer, and a liquid crystal layer located between the first transparent electrode layer and the second transparent electrode layer; and the liquid crystal layer may provide the filter. According to the light control window, the liquid crystal layer can have both the function of switching between a transparent state and an opaque state, and the function of a filter.

According to an embodiment of the present invention, insects are prevented from being attracted to the light control window, and yellowness of the light control window can be reduced.

Obviously, numerous modifications and variations of the present invention are possible in light of the above teachings. It is therefore to be understood that within the scope of the appended claims, the invention may be practiced otherwise than as specifically described herein.

The invention claimed is:

1. A light control window, comprising
a transparent material; and
a light control sheet attached to the transparent material and comprising an adhesive layer attached to the transparent material, and a light control layer attached to the transparent material via the adhesive layer and configured to have a transparent state or an opaque state depending on a voltage applied to the light control layer,
wherein the light control sheet is formed such that at least one of the adhesive layer and the light control layer includes a filter configured to absorb part of light in a visible region, transmittance is 10% or less for light with a wavelength range of 420 nm or less passing through the light control window from the light control sheet toward the transparent material in a first direction, and light from a standard light source D65 that has passed through the light control window from the transparent material toward the light control sheet in a second direction has a yellowness index YI of 10 or less according to JIS K 7373: 2006.

2. The light control window according to claim 1, wherein when the light control layer is in the transparent state, light from the standard light source D65 that has passed through the light control window in the second direction has a Y value of 70% or more according to JIS Z 8781-1: 2012.

3. The light control window according to claim 2, wherein the adhesive layer includes a UV absorption layer, and transmittance is 1% or less for light with a wavelength range of 380 nm or less passing through the light control window in the second direction.

4. The light control window according to claim 2, wherein when the light control layer is in the transparent state or in the opaque state, reflectance is 10% or less for light in the wavelength range of 420 nm or less incident on the light control window in the first direction.

5. The light control window according to claim 2, wherein the transparent material includes soda-lime glass.

6. The light control window according to claim 2, wherein a difference obtained by subtracting the yellowness index YI when the light control layer is in the transparent state from the yellowness index YI when the light control layer is in the opaque state is 0.2 or less.

7. The light control window according to claim 2, wherein transmittance is 10% or less for light with a wavelength range of 620 nm or more incident on the light control window in the first direction.

8. The light control window according to claim 2, wherein the adhesive layer includes the filter.

9. The light control window according to claim 2, wherein the light control layer includes a first transparent electrode layer, a second transparent electrode layer, and a liquid crystal layer formed between the first transparent electrode layer and the second transparent electrode layer and including the filter.

10. The light control window according to claim 1, wherein the adhesive layer includes a UV absorption layer, and transmittance is 1% or less for light with a wavelength range of 380 nm or less passing through the light control window in the second direction.

11. The light control window according to claim 10, wherein when the light control layer is in the transparent state or in the opaque state, reflectance is 10% or less for light in the wavelength range of 420 nm or less incident on the light control window in the first direction.

12. The light control window according to claim 10, wherein the transparent material includes soda-lime glass.

13. The light control window according to claim 10, wherein a difference obtained by subtracting the yellowness index YI when the light control layer is in the transparent state from the yellowness index YI when the light control layer is in the opaque state is 0.2 or less.

14. The light control window according to claim 10, wherein transmittance is 10% or less for light with a wavelength range of 620 nm or more incident on the light control window in the first direction.

15. The light control window according to claim 1, wherein when the light control layer is in the transparent state or in the opaque state, reflectance is 10% or less for light in the wavelength range of 420 nm or less incident on the light control window in the first direction.

16. The light control window according to claim 1, wherein the transparent material includes soda-lime glass.

17. The light control window according to claim 1, wherein a difference obtained by subtracting the yellowness index YI when the light control layer is in the transparent state from the yellowness index YI when the light control layer is in the opaque state is 0.2 or less.

18. The light control window according to claim 1, wherein transmittance is 10% or less for light with a wavelength range of 620 nm or more incident on the light control window in the first direction.

19. The light control window according to claim 1, wherein the adhesive layer includes the filter.

20. The light control window according to claim 1, wherein the light control layer includes a first transparent electrode layer, a second transparent electrode layer, and a liquid crystal layer formed between the first transparent electrode layer and the second transparent electrode layer and including the filter.

* * * * *